United States Patent
Levraud et al.

(10) Patent No.: US 9,625,743 B2
(45) Date of Patent: Apr. 18, 2017

(54) METHOD OF PREPARING AN OPHTHALMIC LENS FITTED WITH A MEMORY MARK

(75) Inventors: Loic Levraud, Charenton le Pont (FR); Dominique Leguy, Charenton le Pont (FR); Eva Lazuka-Nicoulaud, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 673 days.

(21) Appl. No.: 13/576,512

(22) PCT Filed: May 6, 2011

(86) PCT No.: PCT/FR2011/000279
§ 371 (c)(1),
(2), (4) Date: Aug. 1, 2012

(87) PCT Pub. No.: WO2011/141643
PCT Pub. Date: Nov. 17, 2011

(65) Prior Publication Data
US 2012/0314186 A1  Dec. 13, 2012

(30) Foreign Application Priority Data
May 10, 2010  (FR) ...................................... 10 01989

(51) Int. Cl.
*G02C 13/00* (2006.01)
*B24B 9/14* (2006.01)
*G02C 7/02* (2006.01)

(52) U.S. Cl.
CPC ............ *G02C 13/003* (2013.01); *B24B 9/148* (2013.01); *G02C 7/021* (2013.01)

(58) Field of Classification Search
None
See application file for complete search history.

(56) References Cited

U.S. PATENT DOCUMENTS 3,507,076 A * 4/1970 Rudd et al. ................... 451/460
3,631,637 A * 1/1972 Tagnon ......................... 451/390
(Continued)

FOREIGN PATENT DOCUMENTS

| EP | 0 285 490 A1 | 10/1988 |
|----|---|---|
| EP | 1 363 151 A1 | 11/2003 |

(Continued)

OTHER PUBLICATIONS

International Search Report, dated Sep. 9, 2011, from corresponding PCT application.

*Primary Examiner* — Mohammad Ali
*Assistant Examiner* — Kelvin Booker
(74) *Attorney, Agent, or Firm* — Young & Thompson

(57) ABSTRACT

A method of preparing an ophthalmic lens (20) for mounting in an eyeglass frame, the ophthalmic lens including a memory mark (28) that is situated on one of its ophthalmic faces (22) and that forms a code storing in digital form at least one item of information relating to a mechanical, geometrical, or optical characteristic of the ophthalmic lens. The method includes three steps:
a) acquiring a raw image of at least a portion of the optical face of the ophthalmic lens on which an image of the memory mark appears;
b) processing the raw image acquired in step a) in order to decode the information stored in the code; and
c) centering and then shaping the ophthalmic lens as a function of the information decoded in step b).

20 Claims, 3 Drawing Sheets

(56) References Cited

U.S. PATENT DOCUMENTS

| | | | | |
|---|---|---|---|---|
| 4,206,549 A * | 6/1980 | Gould | | 33/200 |
| 4,208,800 A * | 6/1980 | Grolman et al. | | 33/200 |
| 4,653,881 A * | 3/1987 | Joncour | | 351/204 |
| 4,959,118 A | 9/1990 | Herbin et al. | | |
| 5,960,550 A * | 10/1999 | Weir | G02C 7/021 | 33/200 |
| 6,095,896 A * | 8/2000 | Kobayashi | B24B 9/148 | 451/43 |
| 6,142,628 A * | 11/2000 | Saigo | G02C 13/003 | 351/204 |
| 6,170,321 B1 * | 1/2001 | Suzuki | B24B 9/144 | 33/507 |
| 6,220,926 B1 * | 4/2001 | Mizuno | B24B 9/14 | 451/255 |
| 6,328,635 B1 * | 12/2001 | Suzuki | B24B 9/146 | 451/255 |
| 6,813,536 B1 | 11/2004 | Gottschald | | |
| 8,714,739 B2 * | 5/2014 | Rouault De Coligny | | 351/159.57 |
| 2001/0051490 A1 * | 12/2001 | Siders et al. | | 451/5 |
| 2002/0026262 A1 * | 2/2002 | Okada et al. | | 700/164 |
| 2002/0045403 A1 * | 4/2002 | Hatano | B24B 9/148 | 451/5 |
| 2004/0036989 A1 | 2/2004 | Duon et al. | | |
| 2004/0142642 A1 * | 7/2004 | Thepot et al. | | 451/43 |
| 2005/0046792 A1 * | 3/2005 | Ito | B23K 26/04 | 351/159.75 |
| 2005/0073650 A1 * | 4/2005 | Ito | G02C 7/021 | 351/200 |
| 2006/0073771 A1 * | 4/2006 | mandler et al. | | 451/42 |
| 2006/0166605 A1 * | 7/2006 | Hatano | B24B 9/148 | 451/5 |
| 2007/0146687 A1 * | 6/2007 | Divo et al. | | 356/124 |
| 2007/0177101 A1 * | 8/2007 | Divo | | 351/178 |
| 2007/0236657 A1 * | 10/2007 | Mazoyer | | 351/178 |
| 2007/0242221 A1 * | 10/2007 | Guilloux et al. | | 351/177 |
| 2007/0264915 A1 * | 11/2007 | Mazoyer | | 451/64 |
| 2007/0273870 A1 * | 11/2007 | Divo | | 356/124 |
| 2007/0291258 A1 * | 12/2007 | Divo | | 356/124 |
| 2008/0007690 A1 * | 1/2008 | Mazoyer | | 351/177 |
| 2008/0051012 A1 * | 2/2008 | Akiyama et al. | | 451/42 |
| 2008/0055542 A1 * | 3/2008 | Haddadi | | 351/177 |
| 2008/0074612 A1 * | 3/2008 | Kent et al. | | 351/169 |
| 2008/0192200 A1 * | 8/2008 | Iribarne | | 351/177 |
| 2008/0207092 A1 * | 8/2008 | Haddadi | | 451/43 |
| 2008/0273073 A1 * | 11/2008 | Oakley | B41J 2/0057 | 347/103 |
| 2008/0273170 A1 * | 11/2008 | Watanabe | G02C 7/027 | 351/159.81 |
| 2009/0066914 A1 * | 3/2009 | Moinard | | 351/204 |
| 2009/0302122 A1 | 12/2009 | Begon | | |
| 2010/0060851 A1 * | 3/2010 | Allione | | 351/169 |
| 2010/0157243 A1 * | 6/2010 | Boutinon | | 351/177 |
| 2010/0228375 A1 * | 9/2010 | Brechemier et al. | | 700/110 |
| 2010/0290002 A1 * | 11/2010 | Dubois et al. | | 351/177 |
| 2011/0128495 A1 * | 6/2011 | Sayag | | 351/204 |

FOREIGN PATENT DOCUMENTS

| | | |
|---|---|---|
| FR | 2 626 086 A1 | 7/1989 |
| FR | 2 650 679 A1 | 2/1991 |
| FR | 2 900 246 A1 | 10/2007 |
| WO | 2005/093495 A2 | 10/2005 |
| WO | 2006/064107 A1 | 6/2006 |

* cited by examiner

METHOD OF PREPARING AN OPHTHALMIC LENS FITTED WITH A MEMORY MARK

TECHNICAL FIELD TO WHICH THE INVENTION RELATES

The present invention relates in general to preparing an ophthalmic lens for mounting in an eyeglass frame.

The invention relates more particularly to a method of preparing an ophthalmic lens and to an appliance for centering the ophthalmic lens.

TECHNOLOGICAL BACKGROUND

Preparing an ophthalmic lens for mounting in an eyeglass frame selected by a wearer comprises six main operations, of which half are generally implemented by a lens manufacturer and the other half by an optician.

The operations implemented by the lens manufacturer are the following:
 molding the ophthalmic lens to a standard shape so that it presents optical power close to the desired optical power;
 accurately machining one of the optical faces of the ophthalmic lens so that it presents optical power equal to the desired optical power; and
 marking the ophthalmic lens so as to situate accurately particular points and the horizon axis for said lens.

The operations performed by the optician are the following:
 acquiring the outline of one of the rims or of one of the presentation lenses of the eyeglass frame selected by the client (future wearer of the eyeglass frame);
 centering the lens, which consists in positioning and orienting that outline appropriately on the lens as a function of the positions of the particular points and of the orientation of the horizon line of the lens, so that once assembled the lens will be centered relative to the pupil of the wearer's corresponding eye; and then
 shaping the lens, which consists in cutting it to have that outline so that it matches the shape of the selected frame both mechanically and pleasingly, while performing as well as possible the optical function for which it is designed.

Among the various technologies that enable the centering marks on one of the optical faces of the ophthalmic lens to appear, marking by means of an ink pad that is pressed against said optical face is in widespread use because of its simplicity, its low cost, and its accuracy.

In order to protect the lens and avoid the centering marks from being rubbed off, the ophthalmic lens is generally stored in a pouch while it is being transferred from the lens manufacturer to the optician. Normally the pouch is provided with a sticker marked with an identifier and optical data about the optical powers of the lens.

On receiving the lens, the optician can input that information into a computer in order to identify the lens that has been received and verify that it does indeed correspond to the lens ordered from the manufacturer.

The main drawback of that method is that inputting such data is lengthy, time consuming, and also a source of errors.

OBJECT OF THE INVENTION

In order to remedy the above-mentioned drawback in the prior art, the present invention proposes a method of preparing ophthalmic lenses in which the lens characteristics are input automatically.

More particularly, the invention provides a method of preparing an ophthalmic lens including a memory mark that is situated on one of its ophthalmic faces and that forms a one- or two-dimensional code storing in digital form at least one item of information relating to a mechanical, geometrical, or optical characteristic of the ophthalmic lens. According to the invention, the method comprises steps consisting in:
 a) capturing a raw image of at least a portion of said optical face of the ophthalmic lens on which an image appears of said memory mark;
 b) processing the raw image acquired in step a) in order to decode the information stored in the code; and
 c) centering and then shaping said ophthalmic lens as a function of the information decoded in step b).

The memory mark is thus in the form of a visible code that can be seen and interpreted directly. By using this form, the information stored in a digital format is readable by any type of image acquisition means (digital camera, . . . ) associated with appropriate decoding software.

In particular, the information may be read by the image acquisition means of already-existing lens-preparation appliances (centering appliance, grinder, . . . ), providing the decoding software is installed in the central unit of such an appliance, which requires it to be updated and is relatively inexpensive. There is therefore no need to provide a particular hardware element for capturing and processing the raw image of the optical face of the ophthalmic lens.

By virtue of the position of the memory mark (i.e. on the lens), the information it stores remains accessible throughout the operations performed by the optician to prepare the lens, even if the protective pouch has been discarded. There is no possibility of error resulting from the lens being put into the wrong pouch or resulting from wrongly inputting data marked on the pouch.

Finally, since the data remains accessible throughout the operations performed by the optician while preparing the lens, there is no need for any register to store this information and communicate it with the various lens-preparation appliances, thereby simplifying the architecture of the computer network and the software used by the optician while preparing lenses.

According to an advantageous characteristic of the invention, said code is a two-dimensional code storing at least four distinct items of information.

Until now, the sticker carried on the pouch storing the ophthalmic lens carried only essential data about the lens. In order to avoid overcrowding the sticker, data that is less important, but that is nevertheless useful in optimizing centering or shaping of the lens does not appear, and as a result such data has not been directly accessible.

Here, the two-dimensional code used enables the manufacturer to store a large amount of information relating to the characteristics of the lens. This information is then easily accessible and may be read at any moment for use by the optician. For example, it may be read and used in order to improve the accuracy with which, the lens is centered or shaped.

Other characteristics of she method in accordance with the invention that are advantageous and non-limiting are as follows:
 in step a), the raw image of the ophthalmic lens is captured in such a manner as to cause centering marks of the ophthalmic lens to appear, and in step c), the centering of said ophthalmic lens is performed as a function of the positions of said centering marks on the ophthalmic lens;

a device for preparing lenses is provided that includes a centering appliance fitted with acquisition means arranged to acquire raw images of ophthalmic lenses on which there appear images of centering marks marked on said ophthalmic lenses, and in step a), the raw image is acquired by the acquisition means of said centering appliance;

in step a), the image of the memory mark and the images of the centering marks marked on the ophthalmic lens are acquired simultaneously, forming a common overall image;

in step a), the image of the memory mark and the images of the centering marks marked on the ophthalmic lens nay be acquired in succession, to form two distinct images;

said centering appliance includes image processor means for identifying the positions of said centering marks on she ophthalmic lens, and in step b), the image of the memory mark is processed by the image processor means of said centering appliance;

said items of information relate to the shapes of the front and rear faces of the ophthalmic lens, to the thickness of the ophthalmic lens, and to the relative orientations of the front and rear faces of the ophthalmic lens;

said code stores a value of an optical characteristic of the ophthalmic lens, and a step of verifying the ophthalmic lens is provided comprising the following actions: acquiring a value of said optical characteristic by performing a measurement on the ophthalmic lens or by reading in a registry including order data for the ophthalmic lens; comparing said acquired value with the value stored in the code; and verifying that the values are consistent;

said code stores information relating so a map of the thickness of the ophthalmic lens and a step of verifying the ophthalmic lens is provided comprising the following actions: acquiring the shape of an outline to which the ophthalmic lens, is to be shaped; positioning the acquired outline on the ophthalmic lens; determining the thickness of the ophthalmic lens at a plurality of points around the outline while taking account of the information decoded in step b); and verifying chat, at each of said points, the ophthalmic lens presents thickness that is greater than a predetermined minimum threshold;

said code stores information relating to a map of the optical faces of the ophthalmic lens, and a step is provided of viewing the ophthalmic lens, said step comprising the following actions acquiring the shape of an outline to which the ophthalmic lens is to be shaped; positioning the acquired outline on the ophthalmic lens; using the information decoded in step b) to calculate the three-dimensional shape that the ophthalmic lens will present as the end of step c); and displaying said three-dimensional shape on an inspection screen visible to the user;

said code stores information relating to she shape of a pattern of centering marks marked on the ophthalmic lens, and a step of centering the ophthalmic lens is provided during which the position of the pattern of centering marks on an image of the ophthalmic lens is detected with the help of the information decoded in step b);

said code stores information relating to an orientation of a cylinder axis of the ophthalmic lens, and a step is provided of centering the ophthalmic lens, during which step the shape of an outline to which the ophthalmic lens is to be shaped is acquired and the outline is oriented on the ophthalmic lens while taking account of the information decoded in step b);

said code stores information relating so a mechanical characteristic of the ophthalmic lens, and in step c) the ophthalmic lens is shaped with a tool and/or in application of machining parameters that are selected as a function of the information decoded in step b);

said memory mark comprises a plurality of pixels of dimensions greater than or equal to 0.1 millimeters (mm), and in step a), the ophthalmic lens, is positioned relative to the digital means for acquiring said raw image in such a manner that the memory mark extends substantially in the focal plane of said digital acquisition means; and said information is stored in redundant manner in the code in two distinct positions of the memory mark, and in step b), it is verified whether the information decoded at each of said two distinct positions is consistent.

Advantageously, said information decoded in step b) includes at least one of the following characteristics:
an optical category to which the lens in question belongs selected from the following categories: single vision, multifocal, and progressive;
a mechanical category to which the lens in question belongs selected from at least the following categories: fragile and strong;
a material;
a refractive index;
a pattern of centering marks;
a reference for a lens type;
a camber;
a diameter before shaping;
a surface treatment;
a map of the shape of at least one of the optical faces;
a thickness or a thickness map;
a spherical optical power;
a cylindrical optical power;
a prismatic optical power;
a cylinder axis orientation;
an addition;
a destination in terms of right or left position on the eyeglass frame;
an ability to withstand crazing; and
commercial information.

The invention also provides an appliance comprising:
support means for supporting an ophthalmic lens, the ophthalmic lens presenting on one and/or the other of its optical faces centering marks and a memory mark, the memory mark forming a one- or two-dimensional code that stores in digital form at least one item of information relating to a mechanical, geometrical, or optical characteristic of the ophthalmic lens;
means for acquiring a raw image of said ophthalmic lens; and
image processor means arranged to process the raw image of the lens as captured by said capture means in order in particular to decode the information contained in the memory mark code.

Advantageously, said image processor means are adapted to identify the positions of said centering marks on said ophthalmic lens.

It is then preferable for said appliance to be a centering appliance adapted to center said ophthalmic lens as a function of the identified positions of its centering marks.

The form of the memory mark makes it possible in particular to make use of the native imaging means of the centering appliance in order to read the information stored in the memory mark. This reading is inexpensive to implement and then serves to facilitate centering operations. By way of illustration, the reading may for example enable the shape of the pattern of centering marks on the lens to be acquired, which then makes it easier to locate the centering marks of the lens. It may also make it possible to verify that information measured by the centering appliance is consistent with information stored in the memory mark in order to verify that the lens presents the desired optical characteristics. It may also make it possible to verify that information in the lens order is consistent with information stored in the memory mark in order to verify that the lens presents the desired optical characteristics.

DETAILED DESCRIPTION OF AN EMBODIMENT

The following description with reference to the accompanying drawings, given by way of non-limiting example shows clearly what the invention consists in and how it can be reduced to practice.

Figure 1:
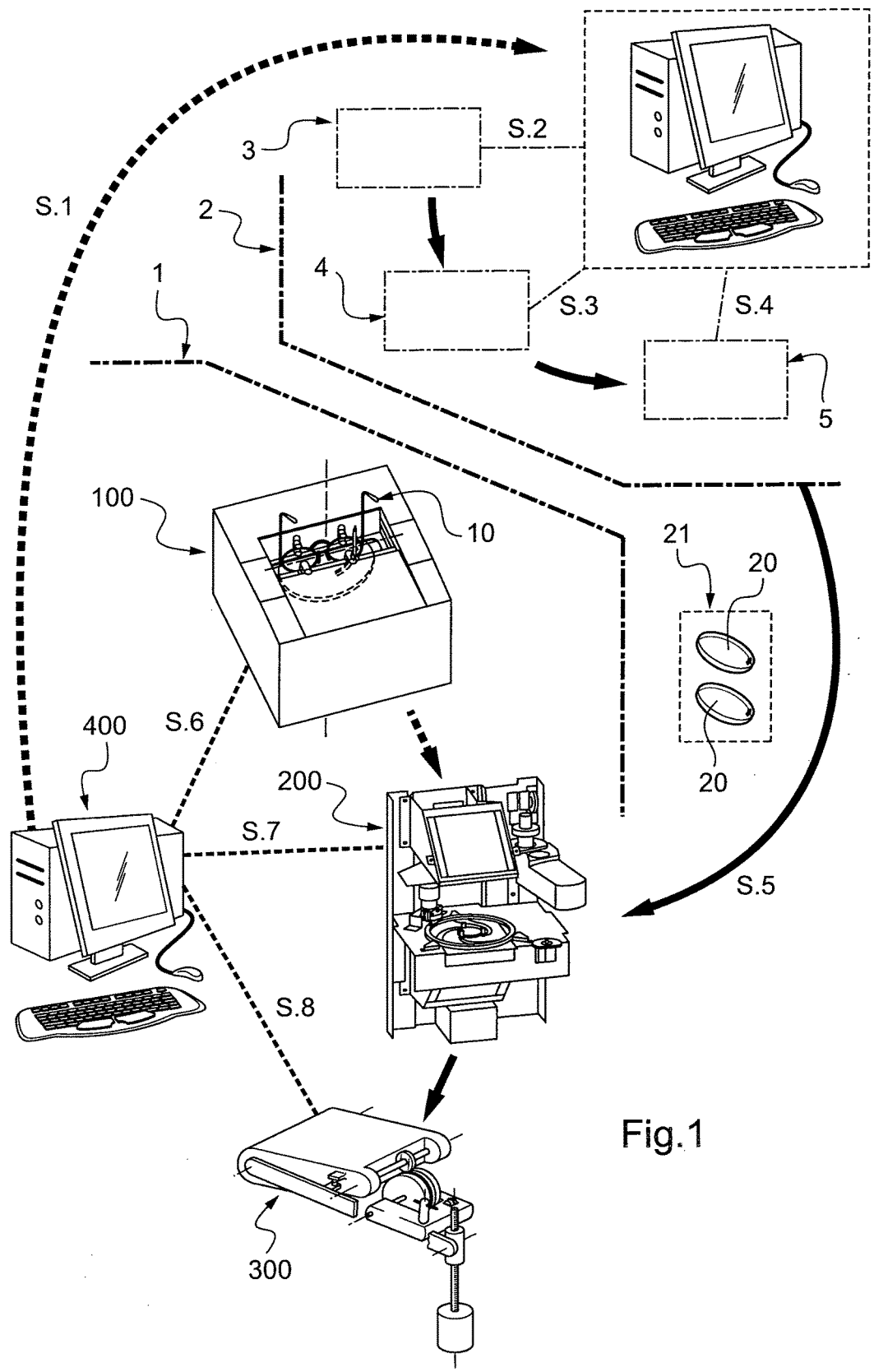
FIG. 1 is a diagram illustrating the method of the invention for preparing an ophthalmic lens.

FIG. 1 is a diagram showing the various operations that make it possible to prepare a job 21 of lenses 20 for mounting in a previously-selected eyeglass frame 10.

The operations are implemented in part on the premises of an ophthalmic lens manufacturer 2, and in part of the premises of an optician 1.

The first operation S.1 is performed by the optician. It consists in determining the optical correcting power prescriptions and the requirements (single vision or progressive, transparent or colored, . . . lenses) of a client, and in communicating this information to the manufacturer 2.

The second operation S.2 consists in the manufacturer 2 molding a job of two ophthalmic lenses 20, by selecting standard molds 3 that enable lenses to be obtained that are of shapes (and optical powers) that are close to those desired.

The third operation S.3 consists in machining the rear faces of the ophthalmic lenses with an appropriate machining appliance 4 so as to obtain lenses that present the looked-for optical powers. This operation is optionally followed by an operation of chemically treating the lens so that its surface presents a desired coating (hydrophobic, anti-scratching, anti-reflection, . . . ).

The fourth operation S.4 consists in marking the lens, e.g. using an ink pad 5, so as to put centering marks thereon. This operation is described herein in greater detail below.

The fifth operation S.5 consists in the manufacturer 2 sending the job 21 of ophthalmic lenses 20 to the optician.

The optician's premises include appliances that enable the optician, on receiving as yet unshaped ophthalmic lenses to prepare chose ophthalmic lenses in order to be able to mount them on the eyeglass frame selected by the client. In this example, these appliances include an outline-reader appliance 100, centering and blocking appliance 200, and a shaper appliance 300, all of which are controlled by a control unit 400.

The outline-reader appliance 100 enables the optician during a sixth operation S.6 to obtain the shapes of the outlines 11 of the rims or of the presentation lenses for the eyeglass frame selected by the client.

The centering and blocking appliance 200 serves during a seventh operation S.7 to center the outlines 11 on the two ophthalmic lenses 20 of the job 21 (see FIG. 4) in such a manner that once they are mounted on the frame, the lenses are properly centered relative to the wearer's (or client s) eyes when looking at infinity.

The shaper appliance 300 serves during an eighth and last operation S.8 to shape the two ophthalmic lenses 20 so as to follow those outlines 11.

Centering and Blocking Appliance

Figure 2:
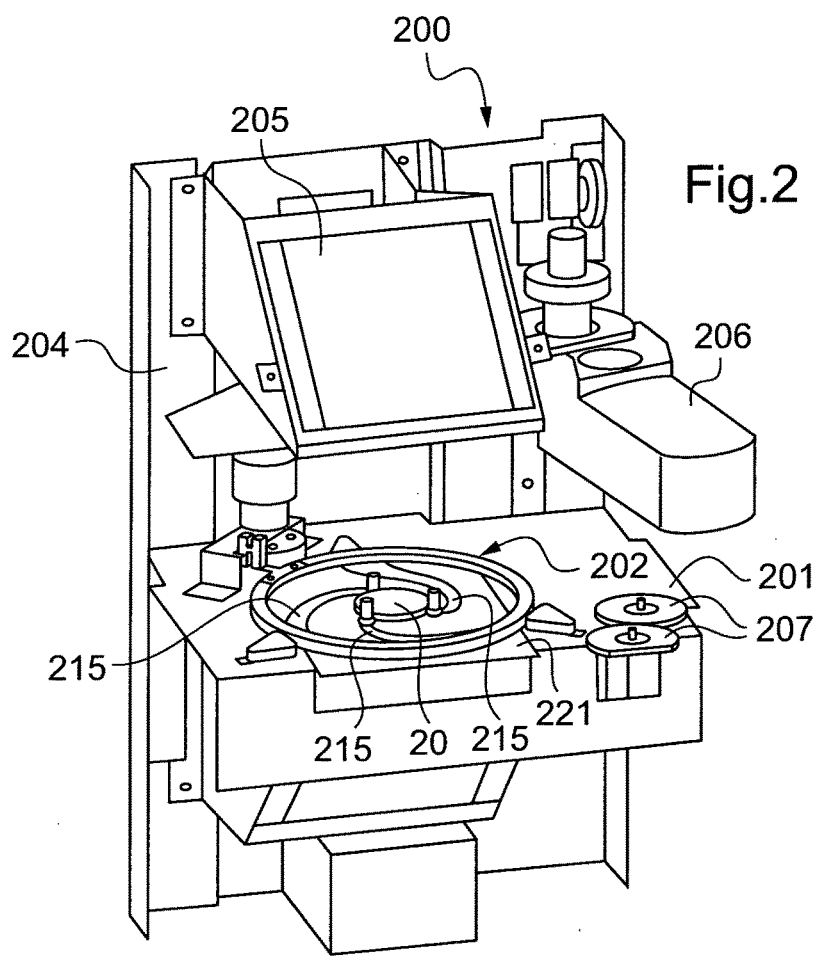
FIG. 2 is a diagrammatic perspective view of a centering and blocking appliance.

FIG. 2 shows the centering and blocking appliance 200 in greater detail.

This appliance is designed firstly to identify the positions of she centering marks on each ophthalmic lens 20 that is to be prepared, and secondly to block the ophthalmic lens 20 by placing a blocking accessory on its front face.

This centering and blocking appliance 200 is well known to the person skilled in the art and does not itself form the subject matter of the invention described. Its architecture and its operation are described in detail, for example in patent document EP 1 722 924.

As shown in FIG. 2, this appliance comprises:

a support structure 204 arranged to define a work bench 201 accessible to the optician;

a holder mechanism 202 for holding the ophthalmic lens 20 that is being prepared, the mechanism having a set of at least three concentrically-clamping jaws 215;

means for optically centering said ophthalmic lens 20;

a display screen 205 fastened to the support 204; and blocking means 206 for blocking the ophthalmic lens 20.

In this example, the centering means comprise a transparent support plate 221 arranged beneath the holder mechanism. 202, lighting means for lighting the ophthalmic lens 20 and arranged under the holder mechanism 202, and means for acquiring and analyzing the light transmitted by said ophthalmic lens 20 through the support plate 221. In this example these acquisition and analysis means comprise a digital camera adjusted in such a manner that the support plate 221 lies in its focal plane, such that the image of the support plate is sharp. The acquisition and analysis means also include image processor means adapted to process the signal obtained at the output from the digital camera, and display means for displaying the processed signal and constituted by the display screen 205.

These centering means serve in particular to acquire an image of the ophthalmic lens 20 and of its centering marks, and to deduce therefrom the position of the optical frame of reference of the ophthalmic lens 20.

These centering means are also adapted to measure the optical refringence powers of the lens. For this purpose, they are designed to display a source image under the lens and to analyze the deformation to which the image is subjected on passing through the lens.

The blocking means comprise a positioning arm 206 that is preferably automatic and that is connected to the support structure 204. The positioning arm 206 is adapted to use a clamp to take one of the blocking accessories arranged on one of the receptacles 207 provided on the support stand 204 and to position the block at a location on the front face of the ophthalmic lens 20 that is determined as a function of the acquired position of the optical frame of reference of said lens.

The blocking accessory thus forms a position-identifying mark representative of the position of the optical frame of reference of the ophthalmic lens as acquired by the optical centering means. It is for engaging in a corresponding socket of the shaper appliance 300 so that the appliance acquires the position of the optical frame of reference of the ophthalmic lens.

Shaper Appliance

The shaper appliance is likewise well known to the person skilled in the art and does not itself form the subject matter of the invention described. It may be embodied in the form of any machine for cutting or removing material that is suitable for modifying the outline of the ophthalmic lens 20 in order to adapt it to the shape of the selected frame.

Figure 3:
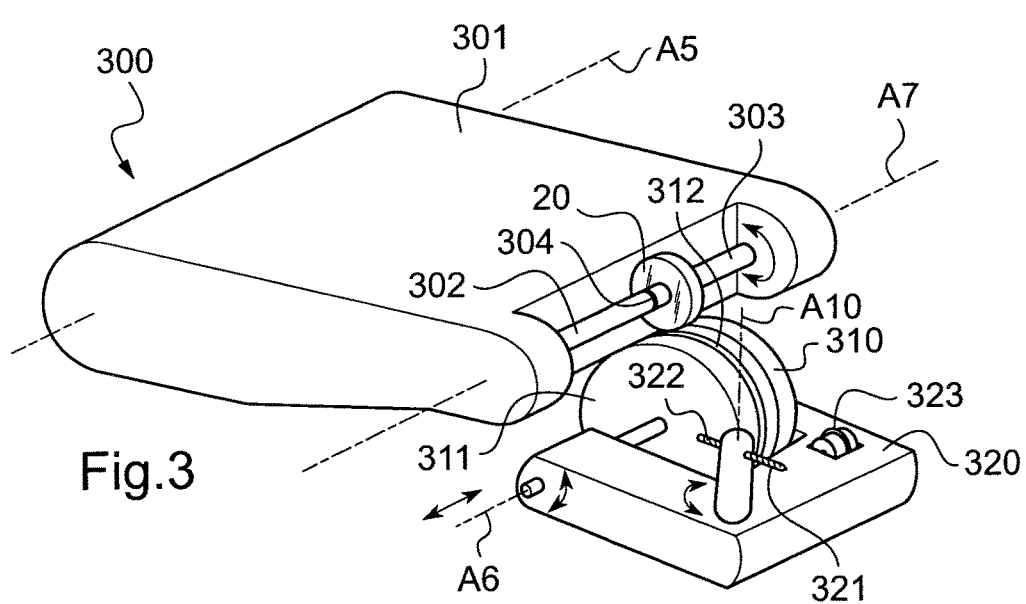
FIG. 3 is a diagrammatic perspective view of a shaper appliance.

As shown in FIG. 3, this appliance is constituted by a grinder 300 that is automatic, i.e. numerically controlled. Specifically, the grinder comprises:

a rocker 301 that is controlled to pivot about a reference axis A5, in practice a horizontal axis, on a frame that is not shown and that supports the ophthalmic lens 20 for machining;

a grindwheel-carrier carriage that is controlled to rotate about a grindwheel axis A6 parallel to the reference axis A5, that is controlled to move in translation along the grindwheel axis A6, and that carries grindwheels 310, 311 that are driven in rotation about the axis A6 by a motor that is not shown; and a finishing module 320 that is controlled to pivot about the grindwheel axis A6 in order to move towards or away from the ophthalmic lens 20 and that carries means for finishing the ophthalmic lens 20.

The rocker 301 is fitted in particular with two shafts 302, 303 for clamping the ophthalmic lens 20 and driving it in rotation about a blocking axis A7 parallel to the axis A5. A first of the two shafts 302 is stationary in translation along the blocking axis A7. The second of the two shafts 303 is on the contrary movable in translation along the blocking axis A7 in order to clamp the ophthalmic lens 20 by applying axial compression thereto.

The first shaft 302 is fitted at its end with a non-removable accessory 304 for blocking the lens. The second shaft 303 is fitted with means for receiving the blocking accessory previously placed on the ophthalmic lens 20 by the arm 206 of the centering and blocking appliance 200.

The set of grindwheels carried by the grindwheel carriage includes a cylindrical shaper grindwheel 310 that serves to rough-out the ophthalmic lens 20 in such a manner as to bring its initially circular outline to a shape close to the desired shape. It also includes a beveling grindwheel 311 for forming an engagement ridge on the edge face of the ophthalmic lens 20 for mounting in a rimmed eyeglass frame.

The finishing module 320 carries a finishing wheel 323 controlled to rotate about an axis parallel to the blocking axis A7 in order to groove, chamfer, and polish the ophthalmic lens 20. It also carries a post that carries a drilling tool 321 and a milling tool 322 for acting on the ophthalmic lens 20, and that is mounted to pivot about an axis A10 orthogonal to the blocking axis A7 in order to select one or the other of these two tools in order to mill or drill the lens.

Ophthalmic Lens

Figure 4:
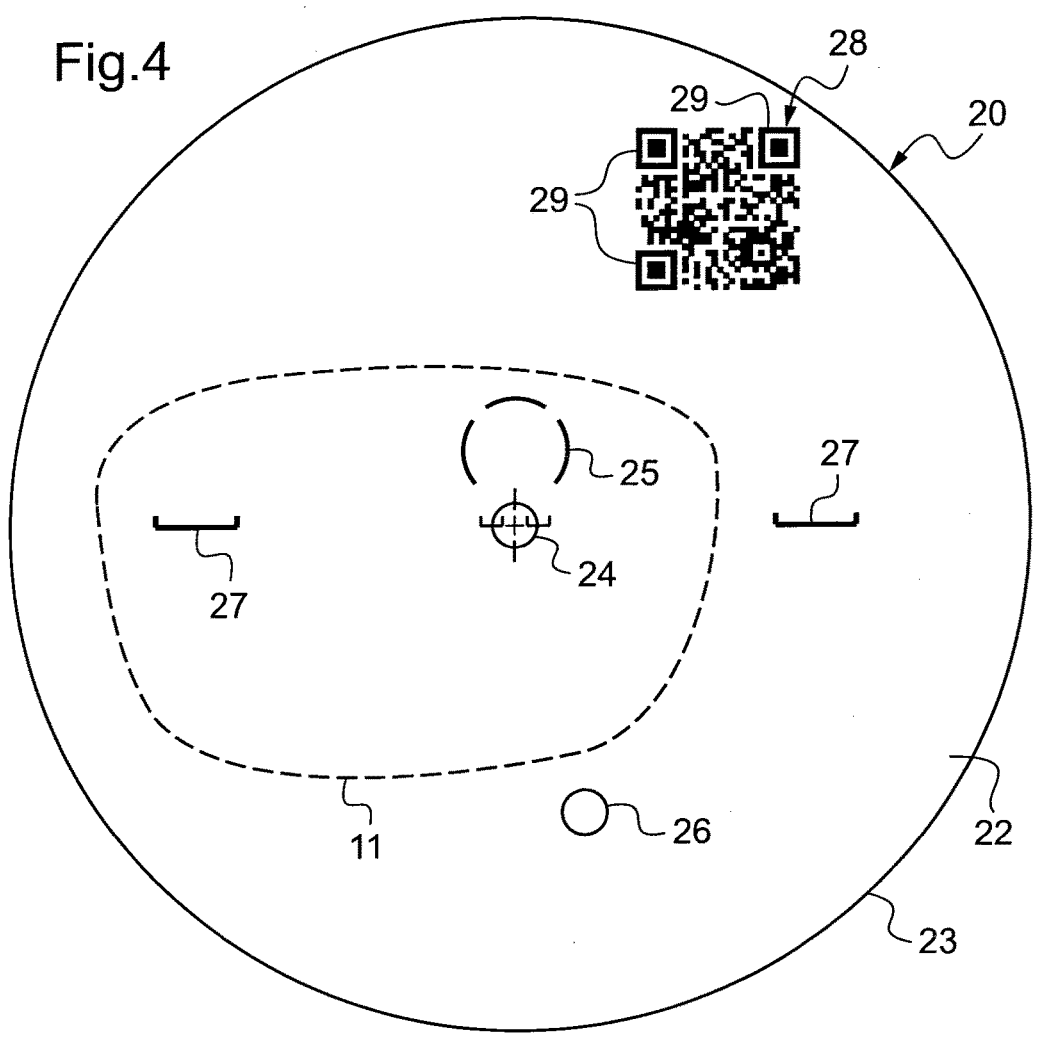
FIG. 4 is a face view of an ophthalmic lens of the invention.

FIG. 4 shows an ophthalmic lens 20 in the presentation that it has on being sent by the lens manufacturer to the optician.

In conventional manner, this ophthalmic lens 20 presents two optical faces, comprising a convex front face 22 and a concave rear face, together with an edge face 23. It is constituted by a substrate having a coating (or surface treatment) deposited thereon by dipping or by chemical evaporation.

This ophthalmic lens presents mechanical, optical, and geometrical characteristics that are specific thereto.

Amongst its mechanical characteristics, the following in particular are defined:

the mechanical characteristics of the substrate of the lens;
the mechanical characteristics of the coating of the lens;
the overall mechanical category of the lens;
the tint of the lens; and
the polarization of the lens.

The mechanical characteristics of the substrate of the lens in this example include the material of the lens (organic material or mineral glass) and the Young's modulus of the lens.

The mechanical characteristics of the coating of the lens include the type of surface treatment (hydrophobic treatment measurable by the surface energy of the lens, anti-scratching treatment, anti-reflection treatment, . . . ) and the ability of the coating to withstand crazing.

The overall mechanical category of the lens is a category given by the lens manufacturer as a function of the overall mechanical strength of the lens. In this context, the various categories are fragile, intermediate, and strong.

Among the optical characteristics, of the lens, the following are defined in particular:

the lens type (single vision, bifocal, progressive);
the optical correction power of the correcting ophthalmic lens, i.e. its refringence properties;
the refractive index of the lens;
the form of the centering marks of the lens; and
the destination of the lens, i.e. the left or the right position in the eyeglass frame.

Among the refringence properties, the first to be defined is the "spherical refringence power" of the lens for an incident beam passing through the lens (also referred so as the total power or the refringent power or the focusing power or the spherical, optical power), with this being the magnitude that characterizes and quantifies the first spherical refringence effect of the lens (magnifying glass effect) on the bean in question: if it is positive, the lens has a converging effect on the beam; if it is negative, the effect on the beam is diverging. The point of the lens where the magnifying glass effect is zero (i.e. for a lens having spherical optical power only, the point where the incident may and the transmitted ray have the same axis) is called the optical center.

The "cylindrical refringence power" of the lens is also defined for an incident ray passing through the lens (also referred to as the cylindrical optical power), and is the magnitude that characterizes and quantifies the cylindrical refringence effect exerted by the lens on the ray in question, whereby it forms not a single focal area but instead two focal areas situated in different planes that are generally mutually perpendicular and referred to as the tangential focus and the sagittal focus. This cylindrical power, also referred to as "astigmatism power" or simply "astigmatism" corresponds to the difference between the spherical powers of the two focal areas. The two areas are separated by an axis passing via their "optical" center, commonly referred to as the cylinder axis.

Finally, there is defined the "prismatic refringence power" of the lens for an incident ray passing through the lens (also referred to as the prismatic optical power), where this is the magnitude that characterizes and quantifies the prismatic refringence effect, or more simply the deflection that is exerted by the lens on the light ray in question. This prismatic power, also referred to as "prism", corresponds to the deflection angle of the light ray, i.e. the angle formed between the incoming and outgoing portions of the light ray. The prism is resolved into two components: a horizontal component referred to as a horizontal prism that corresponds to the angle formed between the projections of the incoming and outgoing portions of the ray onto the horizontal plane, and a vertical, component referred to as the vertical prism that corresponds to the angle formed between the projections of the incoming and outgoing portions of the light ray onto the vertical plane.

For a lens that is bifocal or progressive (i.e. that presents power that varies progressively), there is also defined the "addition" as the magnitude that characterizes and quantifies the difference of the spherical refringence powers between the near vision one and the far vision zone of the lens, i.e. between the two zones of the lens through which the wearer looks on observing a nearby object (typically when reading a book) or a far-away object (typically when observing a landscape).

Concerning the centering marks of the lens, reference is made herein to the temporary centering marks of the lens that are applied to the lens by the manufacturer in order to situate the positions of the remarkable points of the lens. Reference may also be made to the permanent centering marks that are generally in the form of micro-etching. The temporary centering marks serve to provide convenient position-identification on the lens prior to being mounted in an eyeglass frame, whereas the permanent centering marks serve to identify the nature and the characteristics of the ophthalmic lens after the temporary centering marks have been erased.

Together these temporary centering marks form a pattern of a form that is generally common only to lenses of the same brand, manufactured by the same manufacturer.

In this example, as shown in FIG. 4, the pattern of the temporary centering marks of the ophthalmic lens 20 in question comprises:
- a target 24 that locates the "optical centering point" of the lens 20, this optical centering point conventionally corresponding to the point where the spherical refringence power of the lens is zero (for a single vision lens) or the "prism reference" point where the nominal prismatic power of the ophthalmic lens is measured that corresponds to the wearer's prescription (for a progressive lens)
- a circular arc 25 identifying the center of the far vision zone of the lens;
- a circle 26 identifying the center of the near vision zone of the lens; and
- two horizon lines 27 identifying the horizontal for the lens 20.

Among the geometrical characteristics of the lens, the following are defined in particular:
- a diameter before shaping;
- a camber;
- a map of the shape of the front face 22; and
- a map of thicknesses.

The diameter before shaping corresponds no the diameter presented by the edge face 23 of the ophthalmic lens 20 when the lens is received by the optician.

The camber of the lens corresponds to the mean curvature of the ophthalmic lens, which depends typically on the mold used for manufacturing it. It is generally expressed in the form of a "base curve" corresponding to the power (expressed in diopters) of the front face 22 of the lens.

Figure 5:
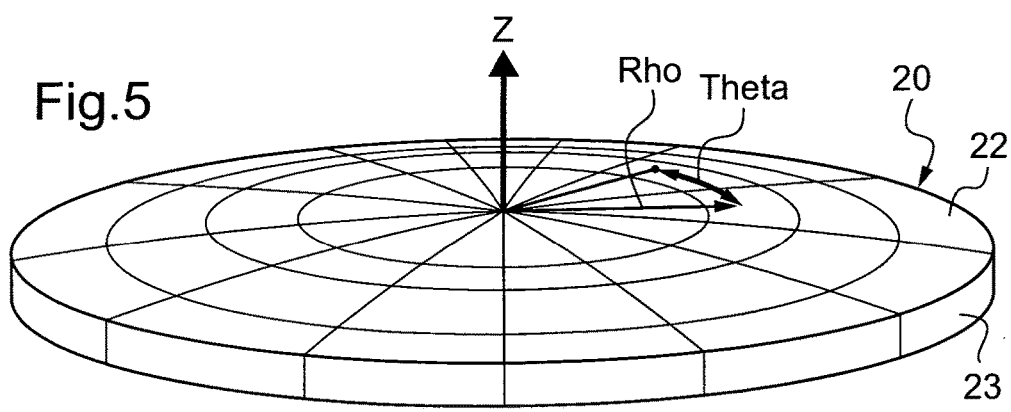
FIG. 5 is a perspective view of a mesh on the FIG. 4 ophthalmic lens.

As shown in FIG. 5, the map showing the shape of the front face of the lens 22 is based on a mesh of the ophthalmic lens 20. The mesh is based on a system of spherical coordinates Rho, Theta, Z in a frame of reference centered on the optical center of the ophthalmic lens 20. In practice, the mesh consists merely in a plurality of coordinates corresponding to the altitude Z of each point of the front face of the lens presenting a radial coordinate Rho equal to a multiple of 0.8 centimeters (cm) and an angular coordinate Theta equal to a multiple of 36 degrees (°).

The map of thicknesses is made in the same manner and it consists in a plurality of thicknesses corresponding to the thicknesses of the ophthalmic lens 20 at each point presenting a radial coordinate Rho equal to a multiple of 0.8 cm and an angular coordinate Theta equal to a multiple of 36°.

In a variant, it would naturally be possible to make provision for characterizing the thickness of the lens by determining a map of the shape of its rear face.

As shown in FIG. 4, the ophthalmic lens 20 in this example has a mark on its front face 22 that is referred to as a "memory mark" in contrast to the centering marks, which memory mark is formed in this example by a two-dimensional code 28 (or "2D code") that stores a certain amount of information in numerical form relating to the mechanical, geometrical, and optical characteristics of the ophthalmic lens 20.

This two-dimensional code 28 preferably stores at least four items of information relating to the mechanical, geometrical, or optical characteristics of the ophthalmic lens.

By way of example, and in order to economize on storage memory, the two-dimensional code may store only the following four items of information:
- the radius of curvature of the front face of the ophthalmic lens (the "front base curve of the lens");
- the radius of curvature of the rear face of the ophthalmic lens (the "rear base curve of the lens");
- the thickness at the optical center of the lens; and
- the angle formed between the normals respectively to the front and rear faces of the lens at the optical center of the lens.

In this example, the code presents sufficient storage capacity to store all of the above-mentioned mechanical, geometrical, and optical characteristics of the ophthalmic lens. It therefore stores information relating to:
- the material of the lens;
- the Young's modulus of the lens;
- the type of coating (hydrophobic, anti-scratching, anti-reflection, . . . ) of the lens;
- the ability of the lens coating to withstand crazing;
- the overall mechanical category of the lens (fragile, intermediate, or strong);
- the type of the lens (single vision, bifocal, progressive);
- the refractive index of the lens;
- the form of the centering mark pattern on the lens;
- the destination of the lens (left or right position);
- the spherical refringence power of the lens;
- the cylindrical refringence power of the lens;
- the orientation of the cylinder axis relative to the horizon lines of the lens;
- the horizontal and vertical prismatic refringence powers of the lens;
- the addition of the lens;
- the form of the centering mark pattern of the lens;
- the diameter of the lens before shaping;

the (front and rear) base curves or the camber of the lens;
the map of the shape of the front face 22 of the lens;
the map of the thicknesses of the lens; and commercial data about the lens, such as the order reference of the lens, the surname and forename of the client for whom the lens is intended, . . . .

In this example, the two-dimensional code is constituted by a standard code of a format such as Datamatrix, QR code, Shotcode, PDF417, or indeed. MaxiCode. Consequently, the list of characteristics stored in the two-dimensional code is not limiting, and it may in particular be modified as required.

The memory mark may be applied to the ophthalmic lens by an ink pad, or preferably it may be printed on the lens or on a sticker that is stuck onto the lens.

The memory mark is in the form of a square presenting sides with a length of about 1 cm.

It comprises a plurality of pixels all having dimensions that are greater than or equal to 0.1 mm, and in this example equal to 0.2 mm. By means of these dimensions, all of the pixels can be detected by the digital camera of the centering means of the centering and blocking device 200.

The image processor means of the centering and blocking device 200 are therefore equipped in this example with decoding software suitable for responding to the colors of the pixels to determine the information contained in the two-dimensional code 28.

The information is preferably stored in redundant manner in the two-dimensional code 28 in distinct zones of the memory mark. Thus, if a portion of the memory mark is erased while the lens is being transported, the information remains readable from the remaining portion of the mark.

As shown in FIG. 4, the code includes at least one distinctive symbol 29, three such symbols in this example, that enable the orientation of the two-dimensional code 28 on the lens to be identified.

In this example, each pixel is either black or white in color, thereby corresponding to a single bit. In a variant, provision may be made to use different colors, e.g. so as to be easier to detect on a lens that is dark in order to perform a solar protection function.

The memory mark is also preferably positioned at a distance from the centering marks 24-27 applied by ink pad on the front face 22 of the lens, so as to avoid being confused therewith.

It is advantageously at a short distance from the edge face 23 of the ophthalmic lens 20, preferably less than one centimeter from the edge face. Thus, the code automatically disappears when the lens is shaped. In a variant, provision may be made for it to be situated in the central portion of the ophthalmic lens, and provision must be made for it to be suitable for being erased or removed from the lens after shaping.

The method of preparing each ophthalmic lens 20 by the optician is then performed with the help of she information contained in the two-dimensional code.

The centering and machining operations are implemented more particularly in this example with the help of this information.

Centering Operation

The centering operation is more particularly implemented as follows.

In a first step, the optician fixes the ophthalmic lens 20 in question between the three jaws 215 of the centering and blocking appliance 200.

In this position, the memory mark 28 of the ophthalmic lens is situated substantially in the focal plane of the digital camera of the appliance, such that the digital camera is capable of acting during a second step to capture a sharp and overall image of the ophthalmic lens 20.

The image as acquired in this way is a "raw image" in the sense that it is not processed or modified in any way whatsoever. It is overall in the sense that all of the ophthalmic lens appears in this image.

During a third step, the image processor means of the appliance analyze the image.

For this purpose, they are designed to identify the memory mark with the help of its distinctive symbols 29 and then to decode the information stored in the two-dimensional code 28. The image processor means thus store all of the optical, mechanical, and geometrical characteristics of the ophthalmic lens 20. They also transmit this data to the control unit. 400 so as to make it accessible to the shaper appliance 300.

The image processor means thus acquire in particular the shape of the pattern formed by the centering marks 24-27 of the ophthalmic lens, and also the destination of the lens (right or left position on the frame). Thereafter, they can thus locate more easily the centering marks 24-27 in the raw image. In a variant, provision may also be made initially to acquire and process a first image of the lens in which the memory mark 28 appears in order or read the information contained in the two-dimensional code, and then subsequently to acquire and process a second image of the lens in which the centering marks appear, in order to center the lens.

The image processor means acquire in particular the theoretical values of the optical refringence powers of the lens, which values, are stored in the two-dimensional code. They also measure the real optical refringence power values of the lens. They can thus compare these values and verify that they are substantially identical. If the difference between the values is greater than a predetermined threshold, the processor means in this example are arranged to display an error message on the display screen 205 informing the optician that the lens presents a refringence power defect.

The theoretical values of the optical refringence powers of the lens that are stored in the two-dimensional code may also be compared automatically or at sight with the data in the lens order, in order to verify that the data is identical.

If the values are substantially identical, the processor means acquire the shape of the outline 11 that is to be imparted to the ophthalmic lens 20 so that it can be mounted in the eyeglass frame selected by the client. This shape is previously measured by the outline-reader appliance 100 that has then transmitted it to the control unit. 400 in order to make it accessible to the centering and blocking appliance 200.

The processor means then superpose an image of the outline 11 on the image of the ophthalmic lens 20 (see FIG. 4), in a position that is a function of the previously-read positions of the centering marks 24-26. In conventional manner, the outline is then oriented relative to the horizon lines 27 of the lens at an angle of inclination that is a function of the orientation of the cylinder axis of the lens. For this purpose, the angle of inclination is previously read from the two-dimensional code 28, thereby avoiding any need for the optician to input this angle of inclination manually.

The processor means then acquire the map of the thicknesses and the map of the front face 22 of the ophthalmic lens. Given the outline 11, they deduce therefrom a three-dimensional representation of the shape that the ophthalmic lens 20 will present after being machined.

This three-dimensional representation serves firstly to verify that the edge face 23 of the lens after machining presents a thickness that is sufficient, firstly to enable the lens to be mounted in the frame (e.g. by verifying that the thickness of the edge face is sufficient to make a bevel for mounting the lens in a rim of a rimmed eyeglass frame), and also to ensure that once shaped the lens is sufficiently strong. For this purpose, this thickness is compared with a threshold value that is either predetermined or else determined as a function of the material or of its Young's modulus or of the overall mechanical category of the lens. If the thickness is smaller than said threshold value at at least one point of the outline 11, then the processor means in this example are arranged to display an error message on the display screen 205 informing the optician that the lens presents thickness that is too small.

In contrast, if the thickness is sufficient, the three-dimensional representation of the lens is displayed on the display screen 205 of the appliance, superposed on a three-dimensional image of the eyeglass frame so that the optician can validate or invalidate the calculations that have been performed. This superposition of images enables the optician in particular to determine whether the appearance of the lens once mounted in the eyeglass frame is satisfactory. It may be presented in various forms, e.g. in the form of a three-dimensional diagram that can be manipulated for viewing at different angles, or indeed in the form of a section diagram for viewing the position of the edge face of the lens relative to the eyeglass frame.

This validation operation is thus implemented while the ophthalmic lens is still on the support plate 201 of the centering and blocking appliance. It thus makes it possible to anticipate potential problems of mounting the lens on the eyeglass frame, so as to make it possible for them to be corrected more easily, more quickly, and at lower cost.

In this example, the three-dimensional representation of the lens is displayed on the display screen 205 of the appliance. In a variant, it could equally well be displayed on some other screen, situated remotely from the appliance. More precisely, the three-dimensional image may be transmitted over a network, e.g. the Internet, to a remote computer. Typically, if the ophthalmic lens is to be shaped not by the optician but by the lens manufacturer, it is thus possible to make provision for the optician to validate the mounting prior to the ophthalmic lens being shaped on the premises of the manufacturer.

Blocking Operation

Once the position of the outline 11 relative to the ophthalmic lens has been validated, the manipulator arm 206 of the centering and blocking appliance 200 proceeds to block the ophthalmic lens 20.

For this purpose, it takes hold of one of the blocking accessories available on one of the receptacles 207 provided on the support structure 204 and then places it on the front face of the ophthalmic lens 20 at the geometrical center (also known as the "boxing center") of the outline 11.

Advantageously, the blocking accessory is put into place without any prior operation of feeling the front face of the ophthalmic lens in order to determine the altitude of the lens at the point where the blocking accessory is positioned. This altitude can be deduced from the map of thicknesses and the map of the shape of the front face of the ophthalmic lens 20, as stored in the two-dimensional code.

In this example, provision is made for the manipulator arm to be capable of taking one or the other of two blocking accessories. In this example the blocking accessories are identical but they are coated in adhesive layers that present different coefficients of adhesion. The means controlling the manipulator arm 206 are designed to select one or the other of these two blocking accessories as a function of the type of coating on the lens and as a function of the ability of the lens to withstand crazing.

A lens that presents a coating that is fragile is therefore blocked, with a blocking accessory having an adhesive layer that presents a small coefficient of adhesion, so as to avoid damaging its coating. In contrast, a lens that presents a strong coating is blocked with a blocking accessory having an adhesive layer that presents a large coefficient of adhesion, thereby enabling the lens to be shaped more quickly without any risk of slip.

In a variant, provision may be made to use blocking accessories of different shapes, with the means controlling the manipulator arm 206 then being designed to select one or the other of these two blocking accessories depending on whether the lens is designed to be mounted in the right position or the left position in the frame.

Shaping Operation

Finally, the centering operation is performed as follows.

The optician positions the ophthalmic lens 20 with its blocking accessory between the two shafts 302 and 303 of the shaper appliance 300. The optician then uses a pushbutton to cause these two shafts to move towards each other so that the lens is sandwiched between them. The electronic unit provided in the shaper appliance 300 then controls the two shafts so that they exert a clamping force on the lens that is deduced from the mechanical characteristics of the lens, in particular from the ability of its coating to withstand crazing. In a variant, provision may be made for the maximum value of the clamping force per unit area (in newtons per square meter ($N/m^2$)) that can be applied no the lens to be stored directly in the two-dimensional code.

The outline-reader appliance 100 enables the optician during a sixth operation S.6 to read the shape of the outlines 11 of the rims or of the presentation lenses of the eyeglass frame selected by the client.

After being assured than the shape of the outlines 11 of the rims or of the presentation lenses of the eyeglass frame selected by the client has been acquired by the outline-reader appliance 100 and then transmitted to the shaper appliance 300, the optician selects the type (rimmed, half-rimmed, or drilled (rimless)) of the eyeglass frame selected by the client. In contrast, the optician does not input any other information, since the other information needed for shaping the ophthalmic lens 20 is stored in its two-dimensional code.

The lens is then shaped in two operations, a roughing-out operation and a finishing operation.

For roughing-out the lens, use is made either of the cylindrical grindwheel 210 so as to reduce the radii of the lens approximately, or else the cutter 322 for cutting the lens until it presents a shape that is identical or similar to that of the outline 11.

In this example, and advantageously, the roughing-out tool is selected as a function of the information stored in the two-dimensional code. By way of example, the lens may be roughed-out (at low cost) using the cylindrical grindwheel if its mechanical characteristics can withstand such machining, or if its overall mechanical category is identified as being "intermediate" or as being "strong". Otherwise, provision may be made to shape it using the cutter 322, if it presents an overall mechanical category that is identified as being "weak".

During this roughing-out, the speed of rotation of the tool and the pivoting speed of the lens-blocking shafts 302 and 303 are calculated as a function of the mechanical characteristics of the lens or as a function of its overall mechanical category. In this way, it is possible to rough-out the ophthalmic lens 20 at a speed that is optimized as a function of its strength.

In order to finish the lens, one of the following is selected:
the beveling grindwheel 311 to make a bevel on the edge face of the ophthalmic lens if it is to be mounted in a rimmed eyeglass frame;
the finishing wheel 323 in order to form a groove in the edge face of the ophthalmic lens if it is to be mounted on a half-rimmed eyeglass frame; or
the drill bit 321 for drilling holes through the lens if it is to be mounted on a drilled eyeglass frame.

Once more, the beveling grindwheel 311 or the finishing wheel 323 may be controlled in application of machining parameters selected as a function of the mechanical characteristics of the lens or as a function of its overall mechanical category.

Typically, the machining parameters as selected in this way are the speed of rotation of the machining tool, the depth of the pass of the machining tool, its speed of advance, or more generally the machining force at the point of contact between the tool and the lens.

Provision may also be made to select the force with which the ophthalmic lens is clamped between the rotary drive and clamping shafts 302 and 303 of the grinder as a function of these mechanical characteristics.

In a variant, provision may be made for these machining parameters to be stored directly in the two-dimensional code.

The drill bit 321 may be controlled to occupy an appropriate position and orientation relative to the lens (i.e. perpendicularly to the front face of the lens where drilling begins) by using the map of the shape of the front face of the lens as stored in the two-dimensional code 28.

Once the first ophthalmic lens of the job has been shaped, the optician extracts the first lens from the two shafts 302 and 303 of the appliance and replaces it with the second lens. Before starting machining of the second lens, the control unit verifies that the destination of the second lens (right or left positions in the frame) is different from the destination of the first lens. If this is not so, it causes an error message to be displayed for reading by the optician.

The present invention is not limited in any way to the embodiments described and shown, and the person skilled in the art knows how to apply thereto any variant in accordance with its spirit.

In particular, the ophthalmic lens may be mapped using a mesh that is different from that described above. A method based on third-degree quadratic Bézier curves would make it possible to reduce the amount of redundant data so as to release space in the two-dimensional code. Provision could also be made for using a mesh that is specific for lenses that present singularities (e.g. bifocal lenses or half-glasses).

In another variant, provision may be made to act as follows to determine more finely the clamping force for application to the lens during the shaping operation.

As is known, the clamping and drilling operations give rise to bending phenomena in the lens, thereby generating stresses therein. Above a certain threshold, known as the "crazing threshold", the coating of the ophthalmic lens may craze and make the ophthalmic lens unusable.

In order to calculate as well, as possible the clamping force and the drilling force to be applied to the ophthalmic lens, it is possible to make provision for storing in the two-dimensional code a map of the distribution of stresses on the front face of the ophthalmic lens. This map specific to the ophthalmic lens can then be used in order to verify that the stresses in the lens always remain below the crazing threshold.

In another variant of the invention, provision may be made for the memory mark not to be in the form of a two-dimensional code (or two-directional bar code) storing information along two distinct axes, but rather to be in the form of a one-dimensional code (or unidirectional bar code) storing information along a single axis. In this variant, the amount of information that can be stored is nevertheless smaller, unless the mark is of great length (which is more difficult to achieve).

The invention claimed is:

1. A method of preparing an ophthalmic lens (20) for mounting in an eyeglass frame (10), comprising the steps of:
preparing the ophthalmic lens for a client;
marking the ophthalmic lens with centering marks (24, 27);
marking an optical face (22) of the ophthalmic lens with a visible memory mark (28) comprised of a code that stores, in digital form, information of geometrical and optical characteristics of the prepared ophthalmic lens;
capturing a raw image of at least a portion of said optical face (22) of the ophthalmic lens (20), said raw image including an image of said memory mark (28) and of the centering marks (24, 27) of the ophthalmic lens (20), said memory mark being separate and distinct from said centering marks, said memory mark storing numerical information in non-numerical form;
decoding the information stored in the code of the memory mark by processing the acquired raw image; and
centering the ophthalmic lens (20) as a function of the position of said centering marks (24, 27) on the raw image, and shaping said ophthalmic lens (20) as a function of the decoded information from the code of the memory mark.

2. The method of claim 1, wherein the code (28) of the memory mark stores i) a radius of curvature of a front face of the ophthalmic lens, ii) a radius of curvature of a rear face of the ophthalmic lens, iii) a thickness at an optical center of the ophthalmic lens, and iv) an angle formed between normals respectively to the front and rear faces of the ophthalmic lens at the optical center of the lens.

3. The method of claim 1, wherein the code (28) of the memory mark is a two-dimensional code (28) comprised of single bit pixels.

4. A method of preparing an ophthalmic lens (20) for mounting in an eyeglass frame (10), the ophthalmic lens (20) including a memory mark (28) that is situated on one of its ophthalmic faces (22) and that forms a one- or two-dimensional code storing in digital form at least one item of information relating to a mechanical, geometrical, or optical characteristic of the ophthalmic lens (20), the method comprising steps of:
a) capturing a raw image of at least a portion of said optical face (22) of the ophthalmic lens (20), said raw image including an image of said memory mark (28) and of centering marks (24-27) of the ophthalmic lens (20), said memory mark being separate and distinct from said centering marks, said memory mark storing numerical information in non-numerical form;
b) processing the raw image acquired in step a) in order to decode the numerical information stored in said code; and c) centering said ophthalmic lens (20) as a function of the position of said centering marks (24-27) on the raw image and then shaping said ophthalmic lens (20); wherein step c) is performed as a function of the numerical information decoded in step b).

5. A method according to claim 4 implemented by a device for preparing lenses that includes a centering appliance (200) fitted with acquisition means arranged to acquire raw images of ophthalmic lenses (20) on which there appear images of centering marks (24-27) marked on said ophthalmic lenses (20), wherein, in step a), the raw image is acquired by the acquisition means of said centering appliance (200).

6. A method according to claim 5, wherein said centering appliance (200) includes image processor means for identifying the positions of said centering marks (24-27) on said ophthalmic lens (20), and in step b), the image of the memory mark (28) is processed by the image processor means of said centering appliance (200).

7. A method according to claim 5, wherein, in step a), the image of the memory mark (28) and the images of the centering marks (24-27) marked on the ophthalmic lens (20) are acquired simultaneously, forming a common overall image.

8. A method according to claim 5, wherein, in step a), the image of the memory mark (28) and the images of the centering marks (24-27) marked on the ophthalmic lens (20) are acquired in succession, and form two distinct images.

9. A method according to claim 4, wherein said code is a two-dimensional code storing at least four distinct items of information relating to at least one of the group consisting of mechanical characteristics of the ophthalmic lens, geometrical characteristics of the ophthalmic lens, and optical characteristics of the ophthalmic lens.

10. A method according to claim 9, wherein said items of information relate to the shapes of the front and rear faces of the ophthalmic lens (20), to the thickness of the ophthalmic lens (20), and to the relative orientations of the front and rear faces of the ophthalmic lens (20).

11. A method according to claim 4, wherein said code stores information relating to a map of the optical faces (22) of the ophthalmic lens (20), and a step is provided of viewing the ophthalmic lens (20), said step comprising the following actions:
acquiring the shape of an outline (11) to which the ophthalmic lens is to be shaped;
positioning the acquired outline (11) on the ophthalmic lens (20);
using the information decoded in step b) to calculate the three-dimensional shape that the ophthalmic lens (20) will present at the end of step c); and
displaying said three-dimensional shape on an inspection screen (205) visible to the user.

12. A method according to claim 4, wherein said code stores information relating to the shape of a pattern of centering marks (24-27) marked on the ophthalmic lens (20), and a step of centering the ophthalmic lens (20) is provided during which the position of the pattern of centering marks (24-27) on an image of the ophthalmic lens (20) is detected with the help of the information decoded in step b).

13. A method according to claim 4, wherein said code stores information relating to a mechanical characteristic of the ophthalmic lens, and in step c) the ophthalmic lens is shaped with a tool or in application of machining parameters that are selected as a function of the information decoded in step b).

14. A method according to claim 4, wherein said information decoded in step b) includes at least one of the following characteristics:
an optical category to which the lens in question belongs selected from the following categories: single vision, multifocal, and progressive;
a mechanical category to which the lens in question belongs selected from at least the following categories: fragile and strong;
a material;
a refractive index;
a pattern of centering marks;
a reference for a lens type;
a camber;
a diameter before shaping;
a surface treatment;
a map of the shape of at least one of the optical faces;
a thickness or a thickness map;
a spherical optical power;
a cylindrical optical power;
a prismatic optical power;
a cylinder axis orientation;
an addition;
a destination in terms of right or left position on the eyeglass frame;
an ability to withstand crazing; and
commercial information.

15. A method according to claim 4, wherein said code stores a value of an optical characteristic of the ophthalmic lens (20), and a step of verifying the ophthalmic lens (20) is provided comprising the following actions:
acquiring a value of said optical characteristic by performing a measurement on the ophthalmic lens (20) or by reading in a registry including order data for the ophthalmic lens;
comparing said acquired value with the value stored in said code; and
verifying that the values are consistent.

16. A method according to claim 4, where said code stores information relating to a map of the thickness of the ophthalmic lens (20) and a step of verifying the ophthalmic lens (20) is provided comprising the following actions:
acquiring the shape of an outline (11) to which the ophthalmic lens is to be shaped;
positioning the acquired outline (11) on the ophthalmic lens (20);
determining the thickness of the ophthalmic lens (20) at a plurality of points around the outline (11) while taking account of the information decoded in step b); and
verifying that, at each of said points, the ophthalmic lens (20) presents thickness that is greater than a predetermined minimum threshold.

17. The method of claim 4, wherein the code (28) of the memory mark stores i) a radius of curvature of a front face of the ophthalmic lens, ii) a radius of curvature of a rear face of the ophthalmic lens, iii) a thickness at an optical center of the ophthalmic lens, and iv) an angle formed between normals respectively to the front and rear faces of the ophthalmic lens at the optical center of the lens.

18. The method of claim 4, wherein the code (28) of the memory mark is a visible two-dimensional code (28) comprised of single bit pixels.

19. The method of claim 4, wherein,
the code (28) of the memory mark is a two-dimensional code (28) comprised of single bit pixels,
the numerical information is stored in redundant manner that includes redundant numerical information in the two-dimensional code (28) in distinct zones of the memory mark such that when a portion of the memory mark is erased, the numerical information remains readable in a remaining, non-erased portion of the memory mark, and the two-dimensional code (28) includes at least one distinctive orientation symbol (29) that enables orientation of the two-dimensional code (28) on the lens to be identified in a de-coding the numerical information stored by the two-dimensional code (28).

20. An appliance (200) comprising:

a support mechanism (202) that supports an ophthalmic lens (20), the ophthalmic lens presenting centering marks (24-27) on one or the other of its optical faces (22), and a memory mark (28) forming a one- or two-dimensional code that stores in digital form at least one item of information relating to a mechanical, geometrical, or optical characteristic of the ophthalmic lens (20), said memory mark being separate and distinct from said centering marks, said memory mark storing numerical information in non-numerical form;

a digital camera positioned to capture a raw image of said ophthalmic lens (20) supported by the support mechanism (202);

an image processor arranged to process the raw image of the lens as captured by said digital camera in order in particular to identify the positions of said centering marks (24-27) on said ophthalmic lens (20) and to decode the information contained in the code of the memory mark (28); and a centering unit adapted to center said ophthalmic lens (20) supported by the support mechanism (202) as a function of the identified positions of the centering marks (24-27).

\* \* \* \* \*